United States Patent [19]
Gusdorf

[11] 3,934,305
[45] Jan. 27, 1976

[54] CASTER SOCKET
[75] Inventor: Walter Gusdorf, Creve Coeur, Mo.
[73] Assignee: Gusdorf & Sons, Inc., St. Louis, Mo.
[22] Filed: Oct. 10, 1974
[21] Appl. No.: 513,552

[52] U.S. Cl. .................................................. 16/43
[51] Int. Cl.² ........................................... A47B 91/00
[58] Field of Search ..................................... 16/43

[56] References Cited
UNITED STATES PATENTS
| | | | |
|---|---|---|---|
| 1,136,201 | 4/1915 | Adams | 16/43 |
| 2,072,132 | 3/1937 | Scott et al. | 16/43 |
| 2,848,732 | 8/1958 | Huff | 16/43 |

Primary Examiner—Patrick D. Lawson
Attorney, Agent, or Firm—Gravely, Lieder & Woodruff

[57] ABSTRACT

A caster socket for articles of furniture for mounting in a receiving slot in the article so that face and back flanges enclose the slot and locate a body which receives the caster swivel post and the back flange has a portion with indexing means to positively locate a stapling gun for driving staples through the back flange to retain the caster socket in operative position.

10 Claims, 6 Drawing Figures

U.S. Patent  Jan. 27, 1976  3,934,305
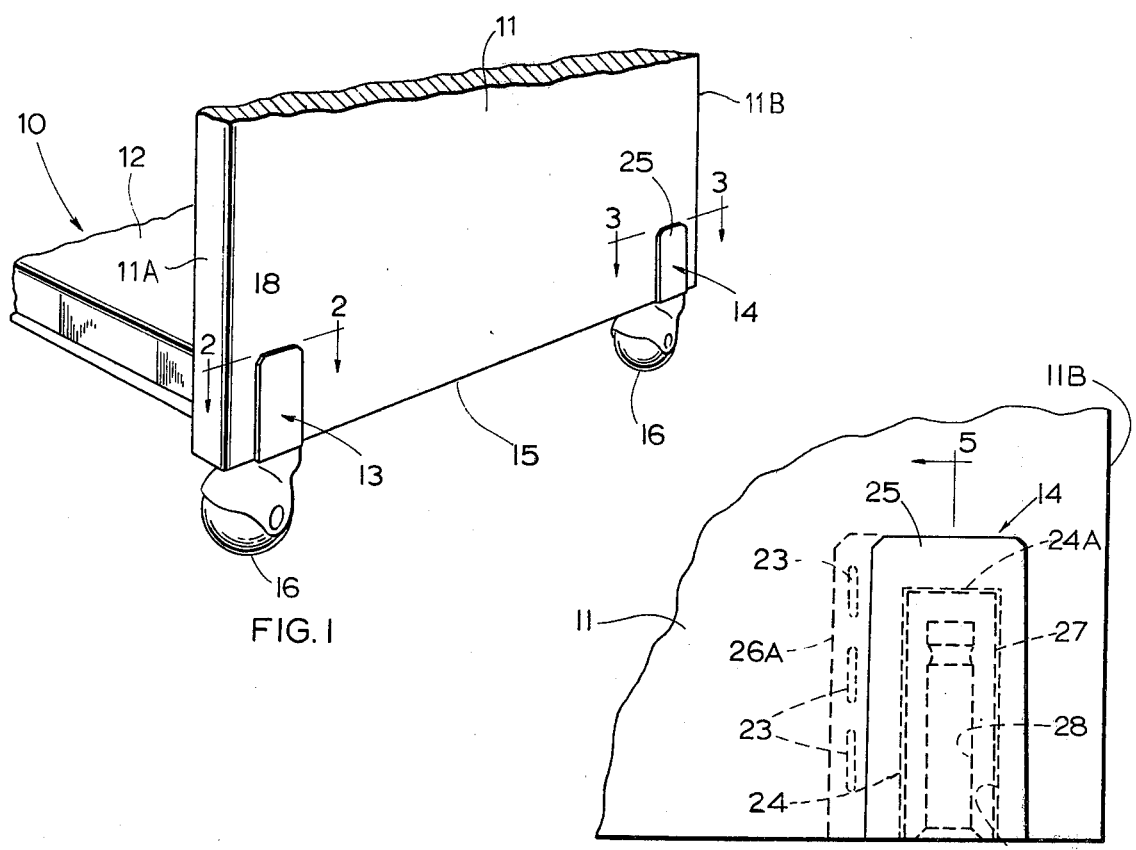
FIG. 1
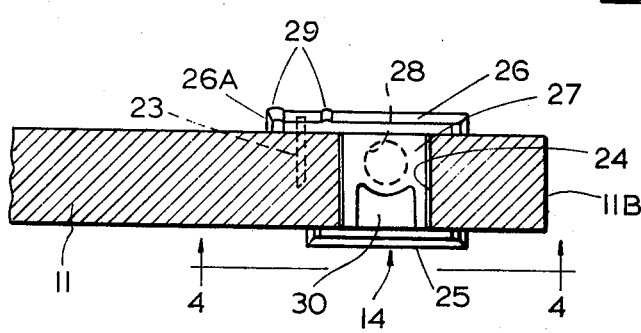
FIG. 4
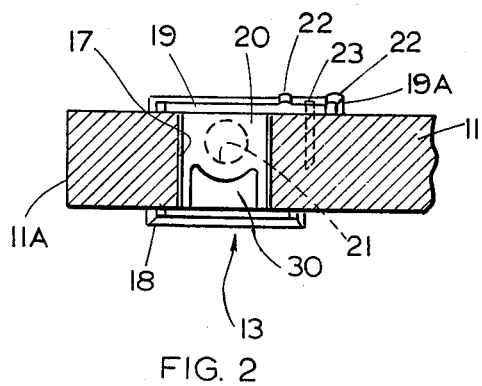
FIG. 3
FIG. 2
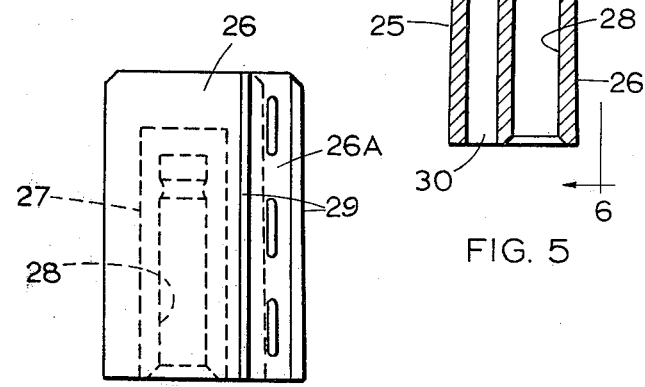
FIG. 5
FIG. 6

CASTER SOCKET

BACKGROUND OF THE INVENTION

This invention relates to caster sockets and is particularly directed to the formation of a socket which has improved resistance to abuse and simplifies the installation in an article of furniture.

A great many casters are mounted with the swivel post fitted into a hole bored into the leg or member of the article needing casters for rendering it movable. While the hole can be made to fit the swivel post in its original condition, the forces imposed will soon cause the swivel post to loosen and cause damage or enlarge the hole. Some casters are mounted in sockets which are held in the furniture by screws, and the screws usually extend through an external flange which in time will work the screws loose. These caster mountings are fine when new, but in time will work loose and often will permanently damage the furniture so that efforts to effect repairs is expensive or even not practical.

Furniture of current designs is especially difficult to caster in view of the extensive use of chipboard material which is easily damaged by screws or nails used with the types of caster sockets heretofore available. However, the caster socket of this invention is arranged with means to engage the article at opposed areas so that the initial fit is relatively undisturbed by rough usage.

It is an important object of this invention to provide a caster socket with the greatest ability to withstand hard usage by forming the socket with sufficient surface contact area to restrict the unit loading so that the surrounding body of material of the article is able to retain its original condition for long periods of time.

Other important objects of this invention are to provide an inexpensive yet strong caster socket which can be installed easily and is easily replaceable; to provide means for avoiding the use of screws and for relocating holding means so that the usual forces imposed on a caster socket are removed from the holding means; to provide a caster socket molded of materials that have the necessary strength and are capable of being plated or treated so as to harmonize with the surface texture and color of the article in which it is mounted; and to provide a caster socket requiring a simple slot or notch to receive it so that face and back flanges are able to abut the margins of the slot or notch with a large enough area of contact to keep the unit loads at an advantageous low value so that the stress is not likely to damage the caster socket or article of furniture.

A presently preferred embodiment of the caster socket includes a body formed with an elongated socket open at one end to receive the swivel post of a caster, a pair of flanges which extend along opposite sides of the body and beyond the end opposite the socket opening so that the body and the flanges form seats to receive the article to which the caster is to be applied, and means on one of the flanges to mark an area thereof to receive securing means which holds the caster socket in operative position. The caster socket is formed of moldable plastic material as a unitary article and is applied by being mounted in a slot or similar opening in the article of furniture so that the flanges and socket body absorb the loads, and securing means engaged between a flange and the adjacent surface of the furniture is substantially free of the sheer and tension stresses heretofore normally imposed by conventional types of caster sockets.

BRIEF DESCRIPTION OF THE DRAWINGS

The preferred embodiment of this invention is shown in the accompanying drawings, wherein:

FIG. 1 is a fragmentary perspective view of an article of furniture having an end panel in which the present caster socket is incorporated;

FIG. 2 is a fragmentary section view taken at line 2—2 in FIG. 1 of a left hand caster socket;

FIG. 3 is a fragmentary section view taken at line 3—3 in FIG. 1 of a right hand caster socket;

FIG. 4 is a fragmentary elevation of the furniture panel with the caster socket in position, the views being taken at line 4—4 in FIG. 3;

FIG. 5 is a longitudinal section view of the caster socket showing the swivel post socket and the upper seat, the view being taken at line 5—5 in FIG. 4; and FIG. 6 is a view of the back side of the caster socket as seen along 6—6 in FIG. 5.

DETAILED DESCRIPTION OF THE EMBODIMENTS

FIG. 1 shows a portion of a mobile cart 10 which has an end panel 11 and a connecting shelf board 12. The opposite end panel is not shown since it will be the same as panel 11 but reversed with respect to its inner and outer faces. A description of the structure associated with panel 11 will be the same for the opposite end panel that is not shown. In general, caster sockets 13 and 14 are mounted in suitable bottom open notches in the lower margin 15 of panel 11, and each socket receives a suitable caster 16, which in this case is of the ball type. It is necessary to construct or form the caster sockets 13 and 14 for right hand and left hand assembly so that the casters 16 can be located close to the outer vertical margins of the panel 11. However, in a different article of furniture, it may not be necessary to have right and left parts.

Turning now to FIG. 2, the left hand caster socket 13 is shown mounted in a notch 17 near the vertical margin 11A of the panel 11. The socket 13 is a one-piece molded member having a front face flange 18, a back face flange 19, and an intervening body 20 formed with a socket bore 21 sized to receive the usual swivel post (not shown) of the caster 16. The back face flange 19 is formed with a side extension 19A having spaced ribs 22 which act to denote a section of the extension in which securing means 23 should be located. In the present case, the securing means 23 are staples set by a suitable stapling gun to drive the staple prongs through the back face 19 and into the end panel 11.

In FIG. 3 it can be seen that the right hand socket 14 is mounted in a notch 24 near the vertical margin 11B of the panel 11. The socket 14 is a one-piece molded member having a front face flange 25, a back face flange 26, and an intervening body 27 having a socket bore 28 to receive the usual swivel post of caster 16. The back face flange 26 of the socket 14 is provided with a side extension 26A on which spaced ribs 29 are formed to denote an area for the insertion of securing means 23 such as staples.

The views of FIGS. 4, 5 and 6 present more detailed disclosure of socket 14. It is to be noted that the front and back face flanges 25 and 26 project above the intervening body 27 to form a seat to engage the inner closed end 24A (FIG. 5) of the notch 24. The body 27 occupies the notch 24 while the face 25 conceals the margins of the notch and presents a pleasing surface to view. The face and back flanges embrace the end panel surface on three sides of the notch 24 so that a very secure mounting of the socket results. The side extension 26A and the spaced ribs 29 furnish a convenient way to attach the socket by use of staples, the elongated ribs guiding the stapling gun.

The socket 13 of FIG. 2 is mounted in the panel 11 in the same manner as just described for socket 14. In each socket, the body 20 or 27 has a cavity 30 to reduce the amount of material needed in the molding thereof. A suitable material for the sockets may be Dow Corning general duty T grade Cycolac plastic which may be surface plated so as to have the front face flanges 18 or 25 treated to harmonize or contrast with the surface treatment for the end panel 11.

The foregoing description has set forth a presently preferred embodiment of a caster socket having an elongated body formed with a caster swivel post receiving socket, face and back flanges projecting outwardly beyond the body to form surfaces abutting and seating in a receiving notch or other opening in an article of furniture, and means on the back flange to locate means to secure the socket in position. The present socket provides an extended surface area around the elongated body and between the flanges so that the loads and side thrust forces caused by moving the article of furniture on the casters will be well distributed for reducing or eliminating the tendency of the socket to loosen and dig into the surfaces of the receiving notch. It is an especially important feature that the present socket is easily installed in a simple notch and is capable of easy removal by extracting the securing staples.

What is claimed is:

1. A caster socket comprising an elongated body formed with a socket opening for the reception of a caster swivel post, a pair of flanges projecting from and spaced apart by said body to form opposed surfaces of abutment, and means on one of said flanges for locating and receiving securing means.

2. A caster socket comprising an elongated body formed with a socket opening for the reception of a caster swivel post, flanges projecting from said body to form surfaces of abutment, said flanges being on opposite sides of said body in facing relation and being wider and longer than said body, and means on one of said flanges for locating socket securing means.

3. The caster socket of claim 2 in which said body has said socket opening at one end and said flanges project outwardly of said body beyond the other end.

4. The caster socket of claim 2 in which said locating means includes a pair of ribs on said one flange, said ribs being spaced apart and extending along said one flange.

5. The caster socket of claim 2 in which said elongated body and flanges form seats on two opposed sides and on one end opposite said socket opening, said seats being defined between said flanges and the intervening surface of said body.

6. The caster socket of claim 5 in which one of said two opposed flanges has an extension outwardly of said body beyond said opposed flange, said locating means being positioned on said extension.

7. In an article of furniture, a member having front and rear surfaces with a slot opening through said surfaces adjacent a margin thereof, a caster socket body fitted into said slot to substantially fill the slot, a first flange on said socket body extending therefrom to engage the front surface of said member adjacent said slot, a second flange on said socket body extending therefrom and being located to engage the rear surface of said member adjacent said slot, and means engaged with one of said flanges and said member thereby securing said caster socket body in said slot.

8. In an article of furniture, a member with a slot formed in a margin thereof, a caster socket body fitted into said slot substantially fill the slot, a first flange on said socket body extending therefrom to engage the surface of said member adjacent said slot, a second flange on said socket body extending therefrom and being located to engage a different surface of said member, and means with one of said flanges and said member securing said caster socket body in said slot, said caster socket body and said first and second flanges being molded in one piece with said flanges maintained in spaced relation such that said body fills said slot and said flanges embrace said front and rear surfaces of said member adjacent said slot.

9. In the article of furniture set forth in claim 8 in which one of said flanges includes means setting off a portion of said flange from the remainder, and said securing means is located in said set off position.

10. Caster mounting means for an article of furniture comprising, in combination: load supporting members of the furniture article to be supported at its bottom edges off the floor by a plurality of casters, each of said members having front and rear surfaces and a pair of slots spaced apart and opening from a bottom edge and through said surfaces; caster mounting means for each slot having a body fitting into said slot, each of said bodies being provided with a socket bore to receive the swivel post of the caster, flange means on each of said bodies positioned to engage said front and rear surfaces of said members, said flanges being formed with surfaces engaged with said front and rear surfaces of said members and extending beyond the margins of said slots; and securing means passing through one of said flanges and pentrating said member to retain said bodies in said slots.

* * * * *